(12) United States Patent
Tong et al.

(10) Patent No.: US 6,603,962 B1
(45) Date of Patent: Aug. 5, 2003

(54) DETERMINING DOPPLER BANDWIDTH OF A RECEIVED SIGNAL FROM A DETERMINED POWER OF A SIGNAL

(75) Inventors: Wen Tong, Ottawa (CA); Rui Wang, Ottawa (CA); Eddy Ning Hum, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/693,870

(22) Filed: Oct. 23, 2000

Related U.S. Application Data

(62) Division of application No. 09/116,479, filed on Jul. 16, 1998, now Pat. No. 6,330,432.

(30) Foreign Application Priority Data

Feb. 25, 1998 (CA) .............................................. 2230589

(51) Int. Cl.$^7$ ............................................... H04B 17/00
(52) U.S. Cl. .................... 455/226.3; 455/67.3; 375/227
(58) Field of Search ........................ 455/63, 67.1, 67.3, 455/226.1, 226.2, 226.3, 242.2, 423; 370/332, 333; 375/343, 346

(56) References Cited

U.S. PATENT DOCUMENTS

| | | | | |
|---|---|---|---|---|
| 5,483,499 A | * | 1/1996 | Brimley et al. | 342/115 |
| 5,513,221 A | * | 4/1996 | Parr et al. | 375/344 |
| 5,570,305 A | * | 10/1996 | Fattouche et al. | 455/72 |
| 5,706,314 A | * | 1/1998 | Davis et al. | 375/340 |
| 5,729,558 A | * | 3/1998 | Mobin | 375/341 |
| 5,884,178 A | * | 3/1999 | Ericsson et al. | 455/441 |
| 6,259,919 B1 | * | 7/2001 | Suonvieri et al. | 455/441 |

* cited by examiner

Primary Examiner—Edward F. Urban
Assistant Examiner—Tilahun Gesesse

(57) ABSTRACT

SIR (signal to impairment power ratio) of a received signal in a communications system is determined from DC components produced by at least two successive stages of performing a non-linear operation, e.g., squaring, the signal and separating the DC component from a non-DC component for supply to the next stage. A signal power of a desired signal component of the received signal can also be determined from the DC components. The signal power can be auto-correlated, and normalized auto-correlation results which exceed a threshold can be used to determine a Doppler bandwidth of the received signal, which can be used to adaptively adjust filters used for separating the DC components.

4 Claims, 3 Drawing Sheets

DETERMINING DOPPLER BANDWIDTH OF A RECEIVED SIGNAL FROM A DETERMINED POWER OF A SIGNAL

This application is a divisional of application Ser. No. 09/116,479 filed Jul. 16, 1998 now U.S. Pat. No. 6,330,432.

This invention relates to determining SIR (Signal to Impairment power Ratio) in a communications system. Impairments include both noise and interference.

BACKGROUND

In a communications system, such as a cellular wireless system, it is known that the SIR of a received signal is a useful signal quality parameter for various procedures. In the case of a system using two or more antennas providing diversity path signals which are subject to fading, the SIR of each path is a particularly useful parameter for use in selection or combining of the diversity path signals for optimum communications. The SIR may also be used in connection with processes such as hand-off, adaptive channel allocation, dynamic power control, and cell tiering.

It is desirable, especially for use for diversity path signal selection or combining, to provide a rapid and accurate determination of SIR for each diversity path signal. The requirements for speed and accuracy conflict with one another, in that typically averaging processes have been used to enhance the accuracy of SIR determination, which slows the determination process. Ideally, a very accurate determination of SIR would be provided instantaneously for each sample of the received signal.

It is also desirable to determine SIR in a receiver having only a single antenna, to determine SIR without reliance on any training sequence or pilot signal, and to achieve this in a manner that is reliable, simple, and easy to implement.

In the case of communications with mobile communications devices or terminals, it can also be important to determine the relative speed at which a terminal is moving. This speed determines the Doppler bandwidth of signals received from the terminal, and affects communications parameters such as fading, and hence SIR, and time requirements for hand-off. Consequently, a determination of the Doppler bandwidth of a received signal also provides useful information.

Objects of this invention are to provide improved methods of and apparatus for determining SIR and Doppler bandwidth of a received signal in a communications system.

SUMMARY OF THE INVENTION

One aspect of this invention provides method of determining SIR (signal to impairment power ratio) of a received signal in a communications system, comprising the steps of: performing a first non-linear operation on the received signal to produce a first non-linearly processed signal; separating DC and non-DC components of the first non-linearly processed signal; performing a second non-linear operation on the separated non-DC component of the first non-linearly processed signal to produce a second non-linearly processed signal; separating a DC component of the second non-linearly processed signal; and deriving the SIR of the received signal from a combination of the separated DC components of the first and second non-linearly processed signals.

The received signal can be a sampled signal and the steps can be performed for individual samples of the received signal, so that the SIR can be determined on a sample by sample basis. If the received signal is represented by a complex signal, then the step of performing the first non-linear operation can comprise multiplying the complex signal by its complex conjugate, which corresponds to a squaring operation. The step of performing the second non-linear operation can likewise comprise squaring the separated non-DC component of the first non-linearly processed signal. Although these non-linear operations comprise squaring, other non-linear operations may alternatively be performed to achieve similar results.

Preferably the step of deriving the SIR of the received signal from a combination of the separated DC components of the first and second non-linearly processed signals comprises the steps of squaring the separated DC component of the first non-linearly processed signal and subtracting from the result the separated DC component of the second non-linearly processed signal, and dividing the result by the separated DC component of the second non-linearly processed signal to derive the SIR.

Each of the steps of separating DC components of the first and second non-linearly processed signals can comprise filtering the non-linearly processed signal to produce a non-DC component of the non-linearly processed signal, and subtracting the non-DC component from the non-linearly processed signal to produce the separated DC component of the non-linearly processed signal. The method can further comprise the step of changing a parameter of the filtering in dependence upon a Doppler bandwidth of the received signal.

The method can further comprise the step of determining a power of a desired signal component of the received signal from the separated DC components of the first and second non-linearly processed signals. It can also comprise the step of determining the Doppler bandwidth of the received signal from the determined power of the desired signal component of the received signal. This preferably comprises auto-correlating the determined power of the desired signal component of the received signal, normalizing auto-correlation results, and determining the Doppler bandwidth from normalized auto-correlation results above a threshold, for example by summing said results above the threshold and/or by determining a difference of said results above the threshold.

Another aspect of the invention provides a communications system receiver including apparatus for determining SIR (signal to impairment power ratio) of a received signal, the apparatus comprising: means for applying a first non-linear function to the received signal and separating the result into first DC and non-DC components; means for applying a second non-linear function to the non-DC components and deriving from the result a second DC component; and means for combining the first and second DC components to produce the SIR of the received signal.

The means for applying at least one of the first and second non-linear functions can comprise a squaring function, and the means for combining the first and second DC components to produce the SIR of the received signal can comprise means for squaring the first DC component, subtracting the second DC component from the squared result, and dividing the result of the subtraction by twice the second DC component to produce the SIR. The receiver can further comprise means for determining a signal power of a desired signal component of the received signal from the first and second DC components, and an auto-correlator responsive to the determined signal power and means for determining a Doppler bandwidth of the received signal from normalized auto-correlation function results which exceed a threshold. All of these means can conveniently be constituted by functions of a digital signal processor.

Another aspect of the invention provides a method of determining a Doppler bandwidth of a received signal from a determined power of the signal, comprising the steps of: performing an auto-correlation of the determined power of the signal for a plurality of correlation delays; and determining the Doppler bandwidth from normalized results of the auto-correlation which exceed a threshold.

The invention also extends to apparatus for determining a Doppler bandwidth of a received signal from a determined power of the signal, comprising: means for performing an auto-correlation of the determined power of the signal for a plurality of correlation delays; and means for determining the Doppler bandwidth from normalized results of the auto-correlation which exceed a threshold.

BRIEF DESCRIPTION OF THE DRAWINGS

The invention will be further understood from the following description with reference to the accompanying drawings, in which.

DETAILED DESCRIPTION

Figure 1:
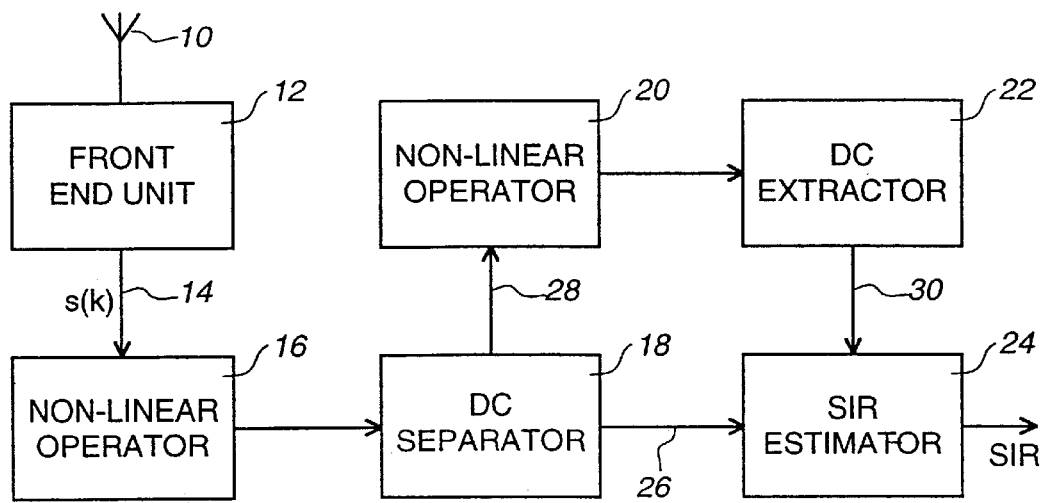
FIG. 1 schematically illustrates a block diagram of parts of a cellular wireless communications receiver incorporating an embodiment of this invention.

Referring to FIG. 1, a block diagram illustrates parts of a cellular wireless communications receiver including an antenna 10 and a front-end unit 12 for producing digital signal samples s(k) of a received signal on a line 14, k being an integer identifying each sample. As is known in the art, the front end unit 12 serves to receive a modulated RF (radio frequency) signal from the antenna 10 and to down convert and demodulate this and to sample and convert the demodulated signal to produce the digital signal samples s(k). The front end unit 12 provides various known functions for example for clock recovery and frame synchronization, which together with other functions of the receiver which are described below can be constituted by functions of one or more digital signal processor (DSP) integrated circuits. As shown in FIG. 1, the receiver also includes units or DSP functions which collectively serve to determine SIR of the received signal samples s(k). These functions comprise a non-linear operator 16, a DC separator 18, a non-linear operator 20, a DC extractor 22, and a SIR estimator 24.

The signal samples s(k) on the line 14, comprising a desired signal together with impairments comprising noise and interference, are supplied to the non-linear operator 16, whose output is supplied to the input of the DC separator 18. The non-linear operator 16 serves to transform envelope-associated components of the received signal into a DC component, and to spread phase-associated components of the received signal across the entire sampling bandwidth. These components are separated by the DC separator 18, which supplies the DC component via a line 26 to the SIR estimator 24 and supplies the other (non-DC) components to the non-linear operator 20 via a line 28.

The non-linear operator 20 provides a further transformation of the signal supplied to its input from the line 28 into a signal envelope-associated DC component and phase-associated components spread across the sampling bandwidth. The further transformed signal is supplied to the DC extractor 22, which separates the DC component and supplies it via a line 30 to the SIR estimator 24. The SIR estimator 24 produces an estimate, or determination, of the SIR from the envelope-associated signals supplied to it via the lines 26 and 30.

It can be appreciated that the units or functions 16 and 18 form a first one, and the units or functions 20 and 22 form a second one, of successive stages of non-linear transformation and DC separation or extraction, and that the arrangement of FIG. 1 can be extended to provide further such stages if desired, the DC extractor 22 being replaced by a DC separator which, like the DC separator 18, provides a second output for the transformed signal, without the separated DC component, for further processing by such stages. However, the non-linear operations increase noise, so that there is a practical limit to the number of such stages that can be used.

Figure 2:
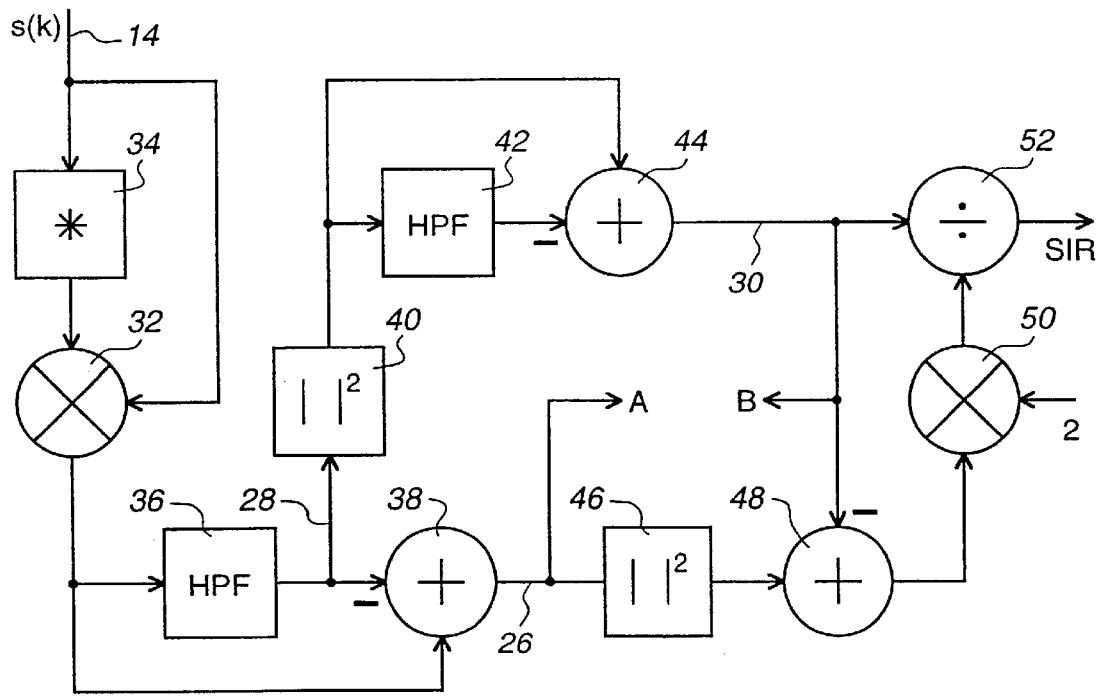
FIG. 2 schematically illustrates in greater detail one form of parts of the receiver of FIG. 1 for estimating SIR.

FIG. 2 illustrates in greater detail one form which the units or functions 16 to 24 of the receiver of FIG. 1 may take. In the arrangement of FIG. 2, the non-linear operator 16 is constituted by a complex signal multiplier 32 and a complex conjugate function 34; the DC separator is constituted by a high pass filter 36 and a summing function 38; the non-linear operator 20 is constituted by a squarer 40; the DC extractor is constituted by a high pass filter 42 and a summing function 44; and the SIR estimator 24 is constituted by a squarer 46, summing function 48, multiplier 50, and divide function 52. Each sample s(k) of the received signal supplied on the line 14 is in the form of a complex signal, the functions 36 to 52 all operate on real (not complex) signals, and the divide function 52 produces the SIR on a sample-by-sample basis. FIG. 2 also illustrates the lines 26, 28, and 30 referred to with reference to FIG. 1, and illustrates that further outputs A and B referred to below are taken from the lines 26 and 30 respectively.

Each received signal sample s(k) comprises a sum of the desired signal and impairment (total noise and interference) which can be written as:

$$s(k)=A_0 e^{j\psi_0(k)}+A_1 e^{j\psi_1(k)} \tag{1}$$

where $A_0$ and $A_1$ are the amplitudes of the envelopes and $\psi_0$ and $\psi_1$ are the phases of the desired signal and the impairment respectively. It is assumed here that the desired signal is typically stronger than the impairment, i.e. that $A_0 > A_1$.

Each signal sample s(k) is in essence squared by being conjugated by the function 34 and multiplied by its complex conjugate (denoted by *) by the multiplier 32, whose output $s_2(k)$ is given by:

$$s_2(k)=s(k)s^*(k)=A_0^2+A_1^2+2A_0 A_1 \cos[\psi_0(k)-\psi_1(k)] \tag{2}$$

This is supplied to the high pass filter 36 which removes the DC component to produce on the line 28 an output signal $s_3(k)$ which is given by:

$$s_3(k) = 2A_0 A_1 \cos[\psi_0(k) - \psi_1(k)] \quad (3)$$

which is subtracted from the output $s_2(k)$ in the summing function 38 to produce on the line 26, and hence at the further output A, a separated DC component $s_4(k)$ given by:

$$s_4(k) = s_2(k) - s_3(k) = A_0^2 + A_1^2 \quad (4)$$

The signal $s_3(k)$ on the line 28 is supplied to and squared by the squarer 40, whose output signal $s_5(k)$ is given by:

$$s_5(k) = (s_3(k))^2 = 2A_0^2 A_1^2 [1 + \cos\{2[\psi_0(k)]\}] \quad (5)$$

This is supplied to the summing function 44, and to the high pass filter 42 which removes the DC component and supplies the resulting signal to a subtracting input of the summing function 44. Consequently, the output $s_6(k)$ of the summing function, which is produced on the line 30 and at the further output B, is the separated DC component of the signal $s_5(k)$, given by:

$$s_6(k) = 2A_0^2 A_1^2 \quad (6)$$

The signal $s_4(k)$ on the line 26 is squared by the squarer 46 and the result is supplied to the summing function 48, to a subtractive input of which the signal $s_6(k)$ on the line 30 is supplied, so that the output $s_7(k)$ of the summing function is given by:

$$s_7(k) = (s_4(k))^2 - s_6(k) = A_0^4 + A_1^4 \quad (7)$$

The signal $s_7(k)$ is multiplied by 2 in the multiplier 50 and the result is supplied to the divide function 52, in which it is divided by the signal $s_6(k)$ on the line 30 to produce at the output of the divide function an estimated SIR $\beta$ which is given by:

$$\beta = \frac{2 s_7(k)}{s_6(k)} = \frac{2(A_0^4 + A_1^4)}{2 A_0^2 A_1^2} = \frac{A_0^2}{A_1^2}\left[1 + \frac{A_1^4}{A_0^4}\right] \quad (8)$$

Denoting the true SIR, which is the ratio of the power of the desired signal to the power of the impairments, as $\gamma$, i.e.:

$$\gamma = \frac{A_0^2}{A_1^2} \quad (9)$$

then it can be seen from equations (8) and (9) that:

$$\beta = \gamma(1 + \gamma^{-2}) \quad (10)$$

which for significant values of SIR ($\gamma \gg 1$) approximates to $$\gamma = \beta. \quad (11)$$

Equation (10) is a quadratic equation which can be solved to determine $\gamma$ exactly from $\beta$ using the equation:

$$\gamma = \frac{\beta}{2}\left[1 + \sqrt{1 - \left(\frac{2}{\beta}\right)^2}\right] \quad (12)$$

which for $\beta > 2$ can be approximated to:

$$\gamma = \beta - \frac{2}{\beta} + \frac{4}{\beta^3} \quad (13)$$

thereby avoiding the need for calculation of the square root which requires significant computing power. In practice, any of equations (11) to (13) may be used to provide a final determination of the SIR $\gamma$. Additionally, a look-up table in memory could be used to determine a final value of the SIR $\gamma$ from the value of $\beta$ calculated by the divide function 52 as described above. It is also observed that, especially in noisy conditions, a final value of $\beta$ and/or $\gamma$ can be established by taking a median value from a plurality of values of SIR within a small window of for example 5 successive samples of the received signal, or by averaging over a larger number of values of SIR determined for respective samples of the received signal.

Figure 3:
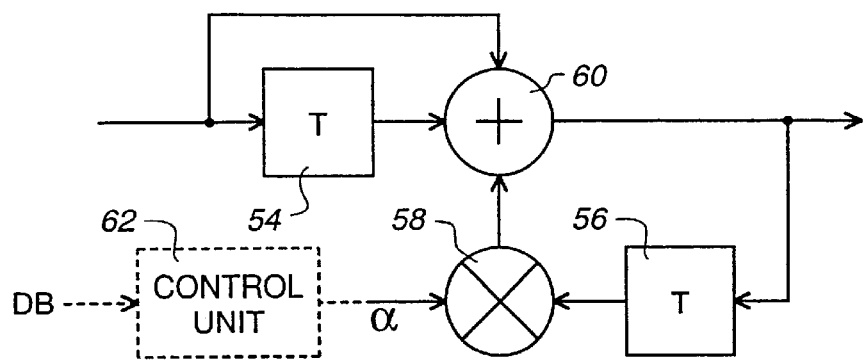
FIG. 3 schematically illustrates in greater detail a form of a high pass filter shown in FIG. 2.

As can be appreciated from the above description, the DC separator 18, comprising the high pass filter 36 and summing function 38, and the DC extractor 22, comprising the high pass filter 42 and summing function 44, have substantially the same form. In each case the high pass filter 36 or 42 is effectively a DC rejection filter, or a notch filter having a notch at DC. FIG. 3 illustrates one form of this filter in full lines, and illustrates in broken lines a variation which is described below.

Referring to FIG. 3, the filter 36 or 42 comprises two delay elements 54 and 56 each providing a delay T equal to the sample period, a multiplier 58, and a summing function 60 whose output constitutes the output of the filter. The input of the filter is coupled directly to one input, and via the delay element 54 to another input, of the summing function 60, whose output is also connected to an input of the delay element 56. The output of the delay element 56 is supplied to an input of the multiplier 58, which is also supplied with a multiplying coefficient $\alpha$ and supplies the product of its inputs to a third input of the summing function 60.

The coefficient $\alpha$, which is in the range from 0 to 1, can be a constant and can be the same or different for the two filters 36 and 42. A value of this coefficient approaching 1 enhances filter performance but increases the filter time constant thereby adversely affecting tracking in a fading environment. By way of example, values of the coefficient $\alpha$ may be about 0.8 for the filter 36 and about 0.9 for the filter 42.

Alternatively, for either or both of the filters 36 and 42 the coefficient $\alpha$ can be varied in dependence upon prevailing conditions or parameters. In particular, the coefficient $\alpha$ can be adaptively adjusted in dependence upon a Doppler bandwidth which can be determined for the received signal, the coefficient $\alpha$ being made to approach 1 when the Doppler bandwidth is small, corresponding to no or slow relative movement between the transmitter of the signal and the receiver, and being reduced with increasing Doppler bandwidth, corresponding to increasing speed of movement between the signal transmitter and receiver, thereby decreasing the filter time constant and improving tracking. To this end, FIG. 3 further illustrates in broken lines a control unit 62 which is responsive to a signal DB, representing the Doppler bandwidth of the received signal, for producing the coefficient $\alpha$ in this adaptively adjusted manner.

Figure 4:
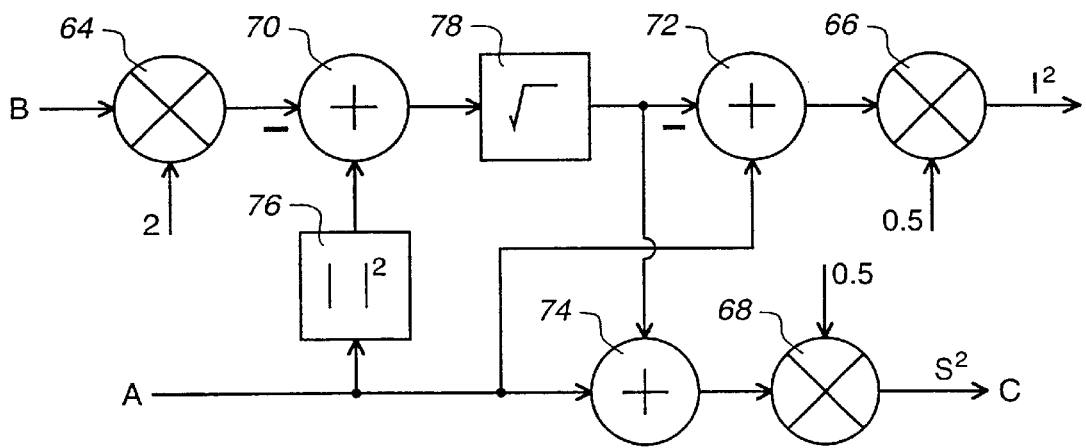
FIG. 4 schematically illustrates an arrangement for estimating signal envelopes from signals produced as shown in FIG. 1 or 2.

The Doppler bandwidth of the received signal is conveniently and effectively determined from the envelope of the desired signal component of the received signal as described below with reference to FIGS. 5 to 7. FIG. 4 illustrates an arrangement for estimating this envelope from signals produced at the further outputs A and B shown in FIG. 2, and for also estimating the envelope of the impairment component of the received signal which could be used for other purposes.

Referring to FIG. 4, the circuit arrangement shown therein comprises multipliers 64, 66, and 68, summing functions 70, 72, and 74, a squarer 76, and a square root function 78. The signal $s_6(k)$ at the further output B of FIG. 2 is supplied to and multiplied by 2 in the multiplier 64, whose output is supplied to a subtractive input of the summing function 70. The signal $s_4(k)$ at the further output A of FIG. 2 is supplied to and squared in the squarer 76, whose output is supplied to another input of the summing function 70. The output of the summing function 70 is supplied to the square root function 78, whose output signal $s_{14}(k)$ is given by:

$$s_{14}(k) = \sqrt{s_{4(k)}{}^2 - 2s_{6(k)}} = \sqrt{(A_0{}^2 + A_1{}^2)^2} = A_0{}^2 - A_1{}^2 \quad (14)$$

This signal $s_{14}(k)$ is supplied to a subtractive input of the summing function 72, whose other input is supplied with the signal $s_4(k)$ from the further output B of FIG. 2, and the output of the summing function 72 is multiplied by 0.5 by the multiplier 66 to produce a power $I^2$ of the impairment component of the received signal, given by:

$$I^2 = 0.5[(A_0{}^2 + A_1{}^2) - (A_0{}^2 - A_1{}^2)] = A_1{}^2 \quad (15)$$

The signals $s_4(k)$ and $s_{14}(k)$ are also supplied to inputs of, and summed by, the summing function 74, whose output is multiplied by 0.5 by the multiplier 68 to produce at an output C a power $S^2$ of the desired signal component of the received signal, given by:

$$S^2 = 0.5[(A_0{}^2 + A_1{}^2) + (A_0{}^2 - A_1{}^2)] = A_0{}^2 \quad (16)$$

It can be appreciated that a ratio of the powers or envelopes $S^2$ and $I^2$ also can provide a determination or confirmation of the SIR γ. However, it is observed that the power $I^2$ produced at the output of the multiplier 68 is typically relatively inaccurate due to the relatively low power of the impairments compared with the desired signal.

It can also be appreciated that the square root function 78 can be simplified by using a truncated Taylor expansion:

$$\sqrt{z} = [1 - (1 - z)]^{0.5} \approx 1 - \frac{(1-z)}{2} = \frac{1+z}{2} \quad (17)$$

where the input z to this function 78 is less than 1, as is typically the case for processing of normalized signals.

The normalized auto-correlation function R(x) of a Rayleigh distributed envelope is a zero order Bessel function of the first kind, i.e.:

$$R(x) = J_0(x) = \sum_{k=0}^{\infty} (-1)^k \frac{x^{2k}}{2^{2k}(k!)^2} \quad (18)$$

where k is an integer, $J_0(x)$ denotes the Bessel function, and $x = \omega_m \tau$, where $\omega_m$ is the Doppler bandwidth and τ is the correlation lag or delay measured in symbol periods T. The Bessel function $J_0(x)$ has an initial (i.e. for x=0) normalized value of 1 and falls to 0 at a value of about x=2.5, defining a main lobe of the function.

Figure 6:
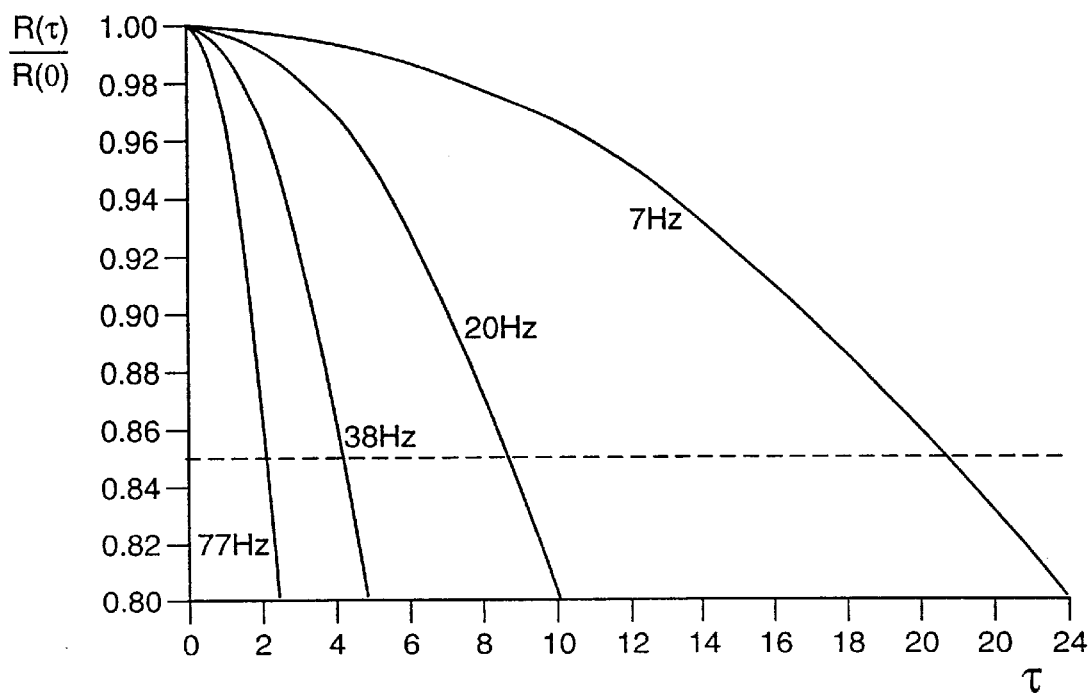
FIG. 6 illustrates normalized auto-correlation functions for different Doppler bandwidths of a received signal.

FIG. 6 illustrates typical forms of the normalized auto-correlation function for different Doppler bandwidths of a received signal, for normalized values R(τ)/R(0) from 0.80 to 1.00 and values of τ from 0 to 24. Thus FIG. 6 shows only the first part of the main lobes of the respective functions, for Doppler bandwidths of 7 Hz, 20 Hz, 38 Hz, and 77 Hz. For normalized values of the functions less than about 0.80, the functions are relatively noisy and hence indefinite. FIG. 6 also illustrates by a horizontal broken line a normalized value threshold which is here chosen to be 0.85 but could be a lower or higher value, below which the values of the normalized functions are not used as described below.

From FIG. 6 it can be seen that there is a consistent relationship between the normalized auto-correlation function and the Doppler bandwidth, and thus the Doppler bandwidth can be derived from the normalized auto-correlation function. In particular, it can be seen from FIG. 6 that the Doppler bandwidth can be determined from the area of the main lobe of the normalized auto-correlation function, and/or from the slope of the normalized auto-correlation function, for values of the normalized auto-correlation function above the threshold.

Figure 5:
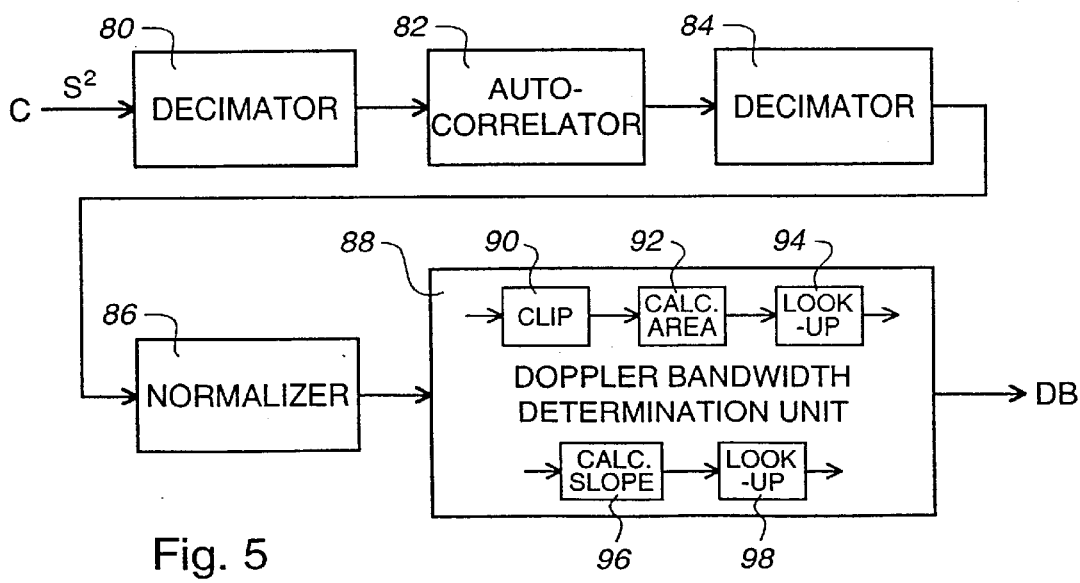
FIG. 5 schematically illustrates an arrangement for estimating Doppler bandwidth of a received signal from signal envelopes.

The arrangement of FIG. 5 makes use of this relationship to produce the signal DB representing the Doppler bandwidth from the desired signal power or envelope $S^2$ produced at the output C of the circuit arrangement of FIG. 4. However, it is observed that the arrangement of FIG. 5 could alternatively be provided with the desired signal power or envelope produced in any other manner. The Doppler bandwidth does not change rapidly, so that decimation is used in the arrangement of FIG. 5 to reduce the computation required and to update the signal DB for example at about 2-second intervals.

Referring to FIG. 5, the arrangement comprises a decimator 80, an auto-correlator 82, a further decimator 84, a normalizer 86, and a Doppler bandwidth determination unit 88. The decimator 80 is supplied with the desired signal power $S^2$ from the output C of the circuit arrangement of FIG. 4, and decimates or down-samples this by a desired decimation factor. For example, for AMPS (Advanced Mobile Phone System) communications having a sampling rate of 48.6 kHz and Doppler bandwidths up to about 100 Hz, the decimation factor may be of the order of 100. Samples passed by the decimator 80 are supplied to the auto-correlator 82, which accordingly carries out the auto-correlation at a rate much less than the communications system sampling rate. The auto-correlator 82 determines the auto-correlation function values R(τ) for values of τ in a part or all of the range from 0 to 24 shown in FIG. 6, τ being in units of the down-sampled or decimated period. The auto-correlation results are further decimated in the decimator 84, for example having a decimation factor of about 1000, to reduce computing requirements and to provide a determination of the Doppler bandwidth about every 2 seconds. The further decimated auto-correlation function results are then normalized in the normalizer 86, the normalization comprising dividing each function result R(τ) by the function result R(0) for τ=0. The output of the normalizer 86 is supplied to the Doppler bandwidth determination unit 88, which produces the Doppler bandwidth signal DB.

The Doppler bandwidth determination unit 88 can have any desired form for deriving the Doppler bandwidth signal DB from the normalized auto-correlation function result. Within this unit as shown in FIG. 5, two alternative or complementary ways of deriving the signal DB are illustrated, and these are described below with additional reference to FIG. 7, which shows in solid lines a graph illustrating primary lobe area of the normalized auto-correlation function plotted against Doppler bandwidth of the received signal.

As shown within the upper part of the unit 88 in FIG. 5, this unit can comprise a clipping function 90, an area calculator 92, and a table look-up function 94. The clipping function 90 passes the supplied normalized auto-correlation function result if it is greater than or equal to the threshold value of 0.85 described above, and otherwise replaces the supplied result with zero thereby to suppress noisy results. The area calculator 94 sums the resulting output of the clipping function, for example for the integer values of $\tau$ from 1 to 24 as shown in FIG. 6, to produce a sum which represents the area of the primary lobe of the normalized auto-correlation function results above the threshold; the vertical axis at the left of FIG. 7 plots this summed area. This sum is supplied as an input to the table look-up function 94, for example constituted by a table stored in memory, which represents the relationship between summed area and Doppler bandwidth represented by the solid line curve in FIG. 7. The output of the table look-up function 94 is the signal DB representing the Doppler bandwidth as shown by the horizontal axis in FIG. 7.

Figure 7:
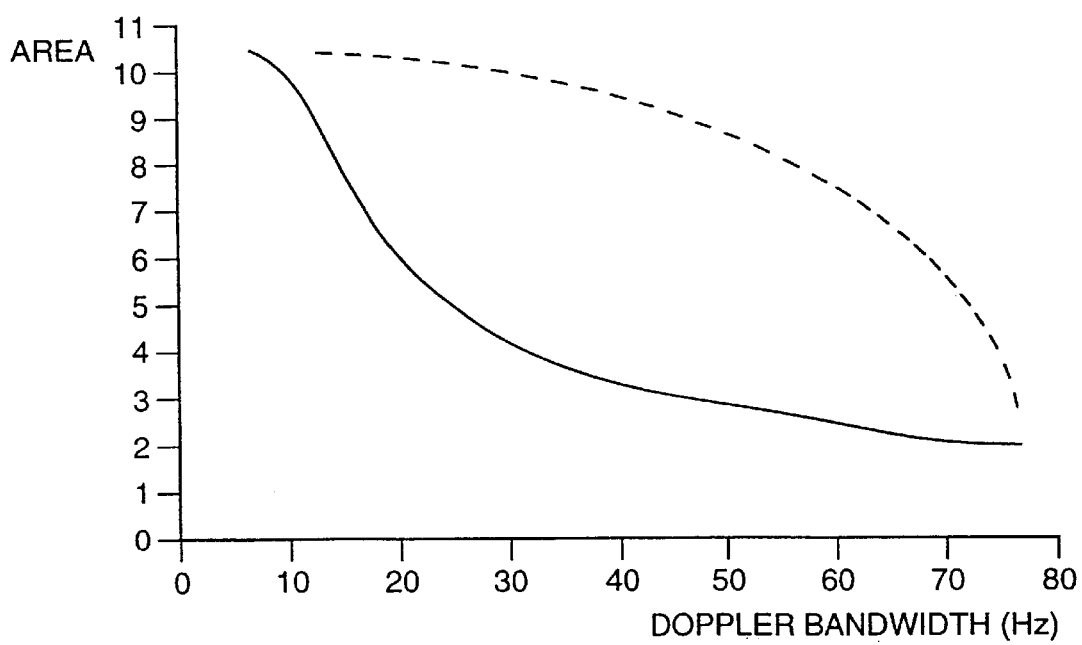
FIG. 7 is a graph illustrating primary lobe area of the normalized auto-correlation functions plotted against Doppler bandwidth of a received signal.

The functions 90 to 94 of the unit 88 provide a fairly accurate determination of the Doppler bandwidth for bandwidths up to about 30 or 40 Hz for which the solid line curve in FIG. 7 is relatively steep, but for higher Doppler bandwidths this curve is relatively flat so that the determination of Doppler bandwidth may be less accurate. In this case, the slope of the normalized auto-correlation function result may provide a more accurate determination of Doppler bandwidth because it has a characteristic which is more of the form shown (for an appropriately scaled vertical axis) by a dashed line curve in FIG. 7. This curve is relatively steep for the higher Doppler bandwidths so that it can provide higher accuracy in determining the Doppler bandwidth, and relatively flat for lower Doppler bandwidths where accuracy of the Doppler bandwidth determination may be less. It can be appreciated, therefore, that either or both of the primary lobe area and slope of the normalized auto-correlation function result can be used for determining the Doppler bandwidth, depending on the desired accuracy of determination for different Doppler bandwidths.

Thus as shown within the lower part of the unit 88 in FIG. 5, this unit can also comprise a slope calculator 96 and a related table look-up function 98. The slope calculator determines the slope of the supplied normalized auto-correlation function result above the threshold value of 0.85, and this slope is supplied to the table look-up function 98 which represents the relationship between the slope and Doppler bandwidth as shown by the dashed line curve in FIG. 7, the output of the table look-up function 98 being an alternative or additional form of the signal DB representing the Doppler bandwidth. By way of example, the slope calculator 96 can determine the slope of the function results by determining one or more differences between the normalized auto-correlation function results for consecutive values of $\tau$ where these results are above the threshold value, e.g. in a region of the auto-correlation function where the normalized value of the function is about 0.90. The unit 88 can further comprise a selector (not shown) for selecting between the outputs of the table look-up functions 94 and 98 to constitute the Doppler bandwidth signal DB.

Although a specific embodiment of the invention has been described above in detail, it can be appreciated that numerous modifications, variations, and adaptations may be made within the scope of the invention as defined in the claims.

What is claimed is:

1. A method of determining a Doppler bandwidth of a received signal from a determined power of the signal, comprising the steps of:

performing an auto-correlation of the determined power of the signal for a plurality of correlation delays; and determining the Doppler bandwidth from normalized results of the auto-correlation which exceed a threshold;

wherein the step of determining the Doppler bandwidth from normalized results of the auto-correlation which exceed a threshold comprises summing said results above the threshold.

2. A method of determining a Doppler bandwidth of a received signal from a determined power of the signal, comprising the steps of:

performing an auto-correlation of the determined power of the signal for a plurality of correlation delays; and determining the Doppler bandwidth from normalized results of the auto-correlation which exceed a threshold;

wherein the step of determining the Doppler bandwidth from normalized results of the auto-correlation which exceed a threshold comprises determining a difference of said results above the threshold.

3. Apparatus for determining a Doppler bandwidth of a received signal from a determined power of the signal, comprising:

an auto-correlator for performing an auto-correlation of the determined power of the signal for a plurality of correlation delays; and a signal processor for determining the Doppler bandwidth from normalized results of the auto-correlation which exceed a threshold;

wherein the signal processor for determining the Doppler bandwidth comprises a summing function for summing said normalized results above the threshold.

4. Apparatus for determining a Doppler bandwidth of a received signal from a determined power of the signal, comprising:

an auto-correlator for performing an auto-correlation of the determined power of the signal for a plurality of correlation delays; and a signal processor for determining the Doppler bandwidth from normalized results of the auto-correlation which exceed a threshold;

wherein the signal processor for determining the Doppler bandwidth determines a slope of said normalized results above the threshold.

* * * * *